United States Patent [19]

Hendrickson et al.

[11] 4,105,050

[45] Aug. 8, 1978

[54] INTEGRAL FLANGED ELASTOMERIC FLOW RESTRICTOR

[75] Inventors: Donald W. Hendrickson, Bedford Canyon Rd., Corona, Calif. 91720; James S. Howard, Riverside, Calif.

[73] Assignee: Donald W. Hendrickson, Corona, Calif.

[21] Appl. No.: 734,227

[22] Filed: Oct. 20, 1976

[51] Int. Cl.$^2$ .............................................. F16K 15/14
[52] U.S. Cl. ...................................... 138/45; 137/517
[58] Field of Search ..................... 138/45, 46; 137/517, 137/845

[56] References Cited

U.S. PATENT DOCUMENTS

| 2,781,058 | 2/1957 | Warhus | 138/45 |
|---|---|---|---|
| 2,815,041 | 12/1957 | Rimsha et al. | 138/45 X |
| 2,891,578 | 6/1959 | Dahl et al. | 138/45 |
| 3,072,151 | 1/1963 | Quercia | 138/45 |
| 3,833,019 | 9/1974 | Diggs | 138/45 |

Primary Examiner—William R. Cline
Attorney, Agent, or Firm—Knobbe, Martens, Olson, Hubbard & Bear

[57] ABSTRACT

An integrally molded, elastomeric fluid flow restrictor for use in pipes to even the volumetric time rate of flow of fluid through a pipe regardless of applied fluid pressure. The restrictor has a flow passage orifice which elastically responds to compressional fluid pressure to vary in size inversely to applied pressure. The restrictor includes integrally attached to the main body upstream and downstream annular flanges of an outer diameter less than the main body diameter, thereby defining a shoulder on the main body, and the flanges have an inner diameter larger than the flow orifice. The shoulder of the main body is beveled slightly inward to seat against a fitting to provide a tight seal in actual operation. A fitting adapted to the restrictor which fits into a hydraulic system is also disclosed.

4 Claims, 5 Drawing Figures

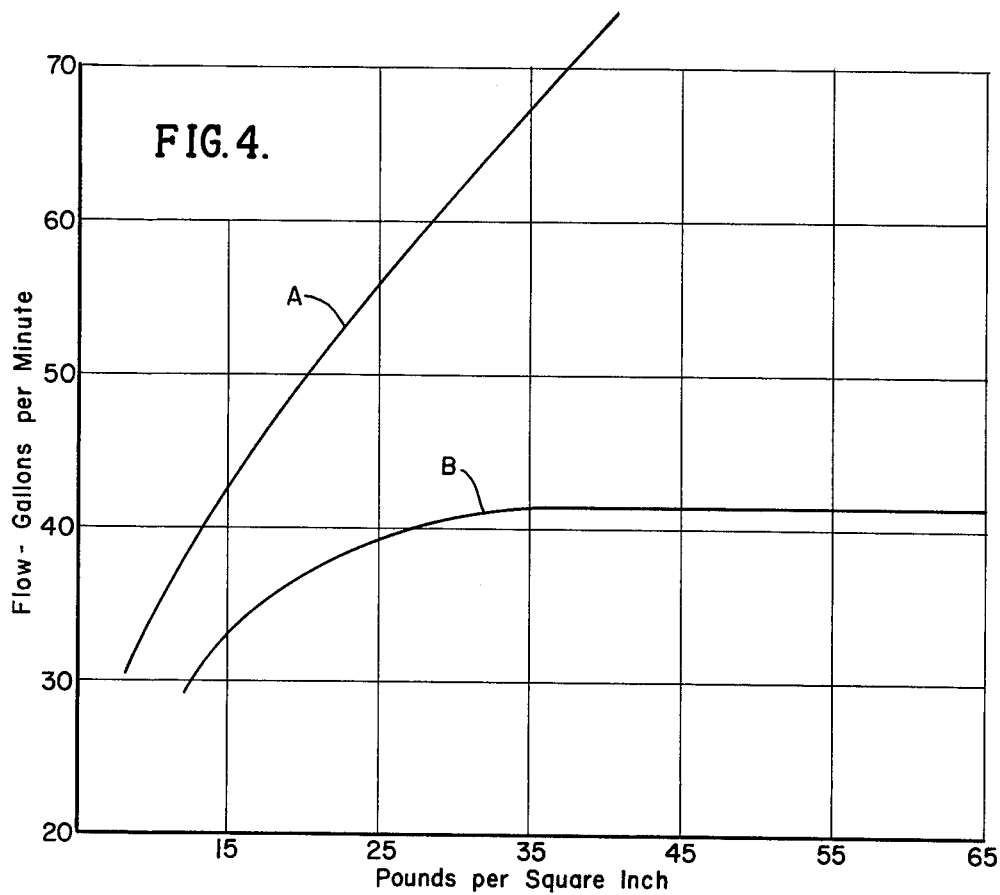
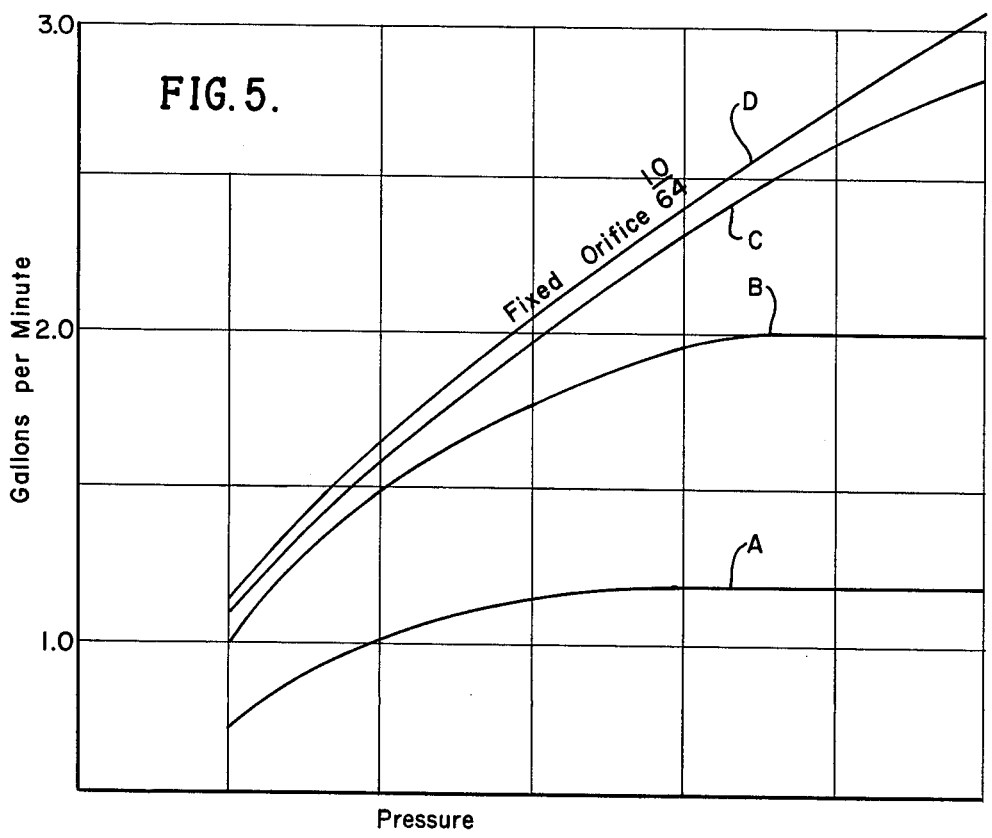

INTEGRAL FLANGED ELASTOMERIC FLOW RESTRICTOR

BACKGROUND OF THE INVENTION

Numerous situations exist where water is piped under pressure to a number of final delivery points in which the distribution system is primarily concerned with delivery of a specified volume of water delivered in a given time period. Typical situations for this are agricultural sprinkler irrigation systems, home garden sprinkler systems, and numerous industrial water delivery systems and timed tank filling operations. Due to a number of factors water pressure of different points within the system may vary, for example, an agricultural or estate sprinkler system may be located in a hilly area, in which case sprinklers at the top and bottom of the hill will have different pressures reflecting the altitude difference. Similarly, the system pressure may vary with time rather than location. For example, other uses on the same main water supply vary from time to time, or the degree to which the supply valve is opened may vary causing the system's initial delivery pressure to vary.

Generally, the final volume rate of flow of water in these systems varies directly with the pressure at the delivery point, e.g., within a broad pressure range, an irrigation sprinkler's water delivery per unit time increases linearly with the water pressure. This creates several problems. First, too high a pressure and consequently high volume flow delivery will rapidly increase the wear on the parts of the delivery system, such as rotating sprinkler heads, increasing capital investment costs. Secondly, a delivery of excessive water simply wastes water, an obviously undesirable consequence. Additionally, for many applications, a constant flow response regardless of pressure will allow for delivery of a set water volume to be controlled solely by timing the system, decreasing monitoring difficulties.

It must be appreciated that to be practical, the control device must be inexpensive. If the delivery is to be controlled just before final delivery, e.g., at each sprinkler head in an irrigation system, then large number of restrictors must be used, and cost per unit must be kept low. Also a wide variety of fittings exist in these systems, necessitating a great flexibility for adapting to varied situations for a control device to be practical. Finally, the control mechanism must deliver a steady output flow over a range of desired pressures, and must not cut off completely delivery at high pressures.

Prior art elastomeric flow controls have had to be encased in a surrounding casing to strengthen them in the region near the flow passage orifice, or their response to pressure input was to cut off at extremely low pressures so that no flow would result. In most applications, flow cutoff is a result that cannot be tolerated in any event.

Since the construction of the prior art constant flow elastomeric restrictors to avoid early flow cut-off required encasement of the elastomeric restrictor, manufacturing costs are relatively high and quality control problems are compounded. Without encasement, the restrictor shuts off all fluid flow at a relatively low pressure in prior art designs. Hence, until now, it has been impossible to make a single, integrally molded device from an elastomeric compound which will have adequate response to a wide range of pressures.

Thus, the prior art elastomeric restrictors have suffered, to varying degrees, from insufficient constant flow response to varying pressures and high unit costs in manufacturing. Accordingly, the present invention minimizes these critical problems in this art.

SUMMARY OF THE INVENTION

A flow restrictor is disclosed which produces a relatively constant fluid volumetric delivery rate in a fluid delivery system over broad ranges of initial input delivery pressures. The flow restrictor is made from an elastomeric compound, and is a single integrally molded member. The main body of the restrictor has an annular orifice for the passage of the fluid through the restrictor. Extending out from the main body of the restrictor in both the upstream and downstream direction from the main body are annular flanges. The flanges have an outer diameter less than that of the main body, and an inner diameter greater than the passage orifice. The flanges define an annular outer shoulder on the main body. The shoulder presses against the end surfaces of downstream fitting. The surface of the shoulder pressing on the end face of the downstream pipe is beveled slightly in the direction of the upstream flow from its outer circumference toward the center to provide for an improved seating of the restrictor against the downstream pipe face end.

In operation the restrictor is placed in a pipe with the main body shoulder abutting the end face of a pipe, or similar structure in a fitting, on the downstream side of the fluid flow. The outer circumference of the restrictor is dimensioned so that it fits snugly against the walls of the pipe or fitting in which it sets. The upstream annular flange also fits snugly in the fitting into which it inserts.

Turning on the water causes the fluid pressure to press against the upstream side of the main body of the restrictor and the upstream flange. This compression force causes the flow orifice to decrease in size due to the elastic properties of the material which the restrictor is molded from. The greater the pressure, the smaller the flow orifice becomes. Thus the increase in flow due to pressure is compensated for by a decrease in flow orifice size, and the two effects tend to balance to produce a steady time rated volume flow through the orifice to the downstream side. The pressure response of the restrictor is a complex response depending upon the size of the orifice opening, the restrictor body, the length and thickness of the upstream flange and downstream flange, and the hardness of the material from which the restrictor is molded. By suitably combining these properties, restrictors producing a relatively steady downstream volume time rate output can be built.

Accordingly, the advantages of the instant invention are the production of relatively steady flow rates over a wide range of pressures by use of a small, inexpensive, easily manufactured elastomeric restrictor having a specialized geometry which is integrally molded as a single member.

Additionally, a fitting adapted to be used with the flange and enabling it to be easily inserted into a fluid delivery system is disclosed.

DESCRIPTION OF THE DRAWINGS

FIG. 4 is a graph of the response of a specific embodiment to varying input pressures with a typical final output;

FIG. 5 is a graph of the response of a standard orifice with varying flow orifice diameters of the invention.

DETAILED DESCRIPTION OF THE INVENTION

Figure 1:
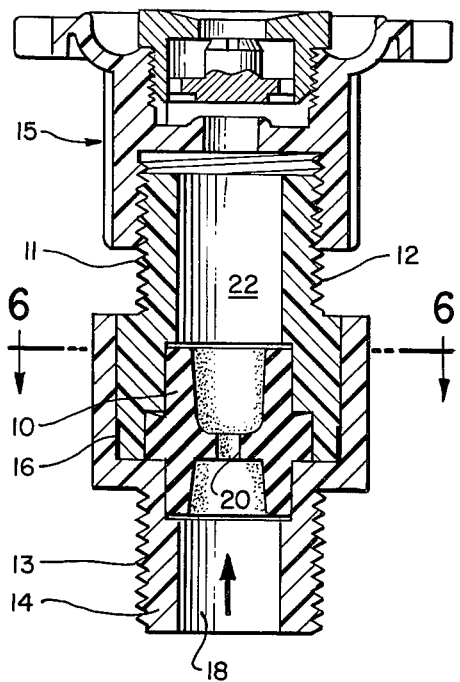
FIG. 1 is a cross-sectional view of the invention placed in a fitting with a sprinkler head attached.

FIG. 1 is a view of the invention inserted for use in a fitting with a typical lawn sprinkler head in position. The flow restrictor 10 is placed inside a fitting 12 which has in turn a fitting 14 placed around it. For purposes of illustration only, a lawn sprinkler 15, which is desired to have a constant volume flow output, has been placed at the output. Other typical applications of the instant invention would have the output attached to drip irrigation equipment, or any other output where a constant flow rate output if found to be highly desirable. It should be understood throughout that fluid will flow from the bottom to the top in all of the discussions of the drawings, i.e., in the direction of the arrow. For convenience, the fittings 12 and 14 may be bonded together along the circumference 16 after placing the restrictor 10 in place, to prevent separation in use due to fluid pressure. The ends of the fittings 12 and 14 may be threaded as with threads 11 and 13 to conveniently provide for attachment to other fluid transport pipes, or may be otherwise adapted to insert in a fluid distribution system.

In operation, generally, the fluid enters along an input duct 18, passes through a flow orifice 20 in the restrictor 10, and into an output duct 22 to the terminal deliverer, which in this case is the sprinkler head 15. The flow orifice 20 responds to the fluid input pressure in duct 18 in a fashion to be described, producing the constant volume flow-out.

Figure 2:
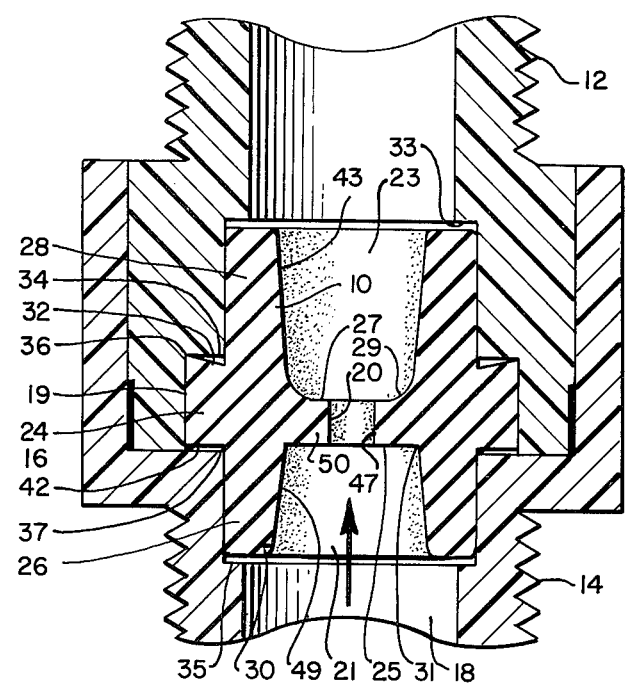
FIG. 2 is an enlarged detail of a portion of FIG. 1 including the restrictor.
Figure 6:
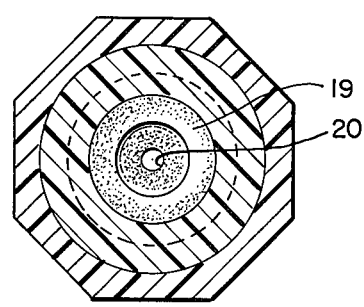
FIG. 6 is a section taken generally along the lines 6—6 of FIG. 1.

Turning to FIG. 2, the details of construction of the restrictor 10 will be discussed. The restrictor element 10 is made from an elastomeric compound. In the preferred embodiment it is made by injection molding from a thermoplastic vinyl elastomer having a hardness from 40 to 90 A. The hardness of the elastomer is adjusted to produce the desired constant volume response characteristics to input pressure.

The restrictor consists of an annular central body portion 24 having integral annular, cylindrical flanges 26 and 28 extending from its opposite, upstream and downstream, ends. The outside diameter of the body portion 24 is larger than that of either flange 26 or 28 thereby forming an annular flange portion 19 on the main body having upstream annular shoulder 42 and a downstream annular shoulder 32 on its opposite faces.

The internal wall 43 of the downstream flange 28 forms a cavity 23, and the internal wall 49 of the upstream flange 26 forms a cavity 21. A wall 50 in the central body portions having a downstream face 27 and an upstream face 25 separates the cavities 21 and 23. An orifice 20 of much smaller diameter than the cavities 21 and 23 extends axially through the wall 50. For convenience, a small notch may be cut on one of the flange faces, as, for example, at point 30, so that the upstream annular flange 26 may be readily distinguished from the downstream annular flange 28 during assembly.

The downstream shoulder 32 is beveled very slightly so that its outer periphery 36 extends further downstream than its juncture with the downstream flange.

In the preferred embodiment the cavity 23 extends upstream into the central body portion 24 to shorten the length of the orifice 20. Also the bottom of the cavity 23 is rounded as at 29 whereas the cavity 21 has sharper bottom corners as at 31.

The exemplary fitting 12 has two annular shoulders 33 and 34 formed by changes in diameter of the fitting bore. Similarly, the fitting 14 has two shoulders 35 and 37 formed by changes in diameter. When the fittings 12 and 14 are connected, the axial length between the shoulders 37 and 34 on the fittings is slightly greater than that between the shoulders 32 and 42 of the central body portion of the restrictor so that the restrictor fits within the shoulders 34 and 37 loosely. Similarly, the axial dimension between fitting shoulders 33 and 35 is slightly greater than the overall length of the restrictor 10. Thus, the restrictor is not axially compressed by the fittings.

The exterior diameters of the flanges 26 and 28 and main body portion 24 are such as to fit snugly against the adjacent fitting walls, but no seal is provided by such fit.

The operation of the improved flow restrictor can be understood by referring to FIG. 2. It should be understood that FIG. 2 does not illustrate how the restrictor will deform under actual conditions. The details of this deformation will be discussed with reference to FIG. 3. Fluid entering the duct 18 under pressure passes between the upstream flange 26 and the adjacent wall of the fitting 14 and bears against the shoulder 42 of the restrictor. This fixes the periphery 36 of the downstream shoulder 32 tightly against the shoulder 34 of the fitting 12 to seal against leakage around the restrictor. The fluid under pressure also bears against all other upstream surfaces of the restrictor, including all surfaces of the flange 26 and the face 25. Because of the elastomeric composition of the restrictor 10, the compressional force from the fluid pressure deforms the member 10 and causes the orifice 20 to decrease in size. The greater the pressure at the input 18, the more the elastomeric restrictor 10 deforms to decrease the size of the orifice 20. It should be understood that this decrease in size of the orifice 20 comes largely from compression of the elastomeric material in the flange 26 and the body 24 and not just from downstream deflection of the wall 50.

The annular upstream flange 26 and downstream flange 28 strengthen the wall member 50 against deflection and deformation. This causes the orifice 20 to restrict in size, under pressure, more nearly uniformly along the length of the orifice 20. This greatly improves the pressure response of the restrictor and makes it possible to manufacture it out of one integral elastomeric member. Thus, prior art devices made solely from an elastomeric compound either shut off at very low pressures, or required expensive encasement in the region near the flow orifice and could not be made from a uniform elastomeric compound, or had insufficient constant flow response to varying pressure inputs. The geometry of the restrictor taught here enables the production of elastomeric flow restrictors from one inexpensive, integral, uniform elastomeric molded member, which can be designed to respond to high pressure without shut off and provide satisfactory, uniform time-rate of fluid volume flow over a wide range of desirable pressures without non-elastomeric casings near the flow orifice.

Figure 3:
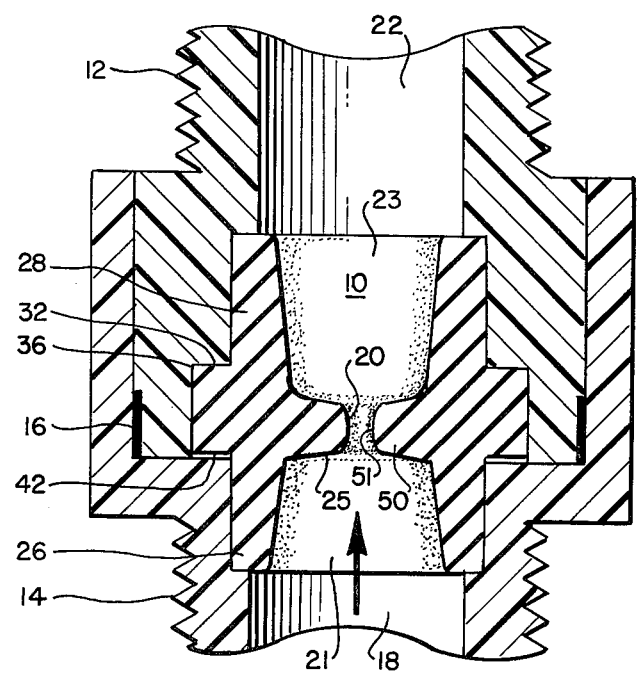
FIG. 3 is a view showing the restrictor as it deforms under pressure.

FIG. 3 better illustrates the deformation of the restrictor 10 which reduces its size by elastic flow forming a bulge in orifice 20. Fluid under pressure entering from the bottom of FIG. 3, presses against all of the upstream surfaces of the restrictor 10. However, due to the strengthening presence of the upstream flange 26 and downstream flange 28, the wall 50 does not tend to deflect very greatly. Instead, the wall 50 bulges along surface 47 forming the annular bulge 51 due to elastic flow of material in response to the pressure forces on the elastomeric restrictor 10. The decrease in the size of the orifice 20 is primarily caused by this bulging, and not by downstream deflection of the wall 50. This produces the highly satisfactory pressure response of this restrictor. The flanges 26 and 28, in addition to strengthening the wall 50, also provide additional elastic flow material to the main body 24 to participate in the bulging process.

Those skilled in the art will also recognize that the orifice 20 acts as a venturi tube and this causes the pressure in the regions of cavities 21 and 23 to be greater than that in the orifice 20 under actual flow conditions. This contributes to the bulging of wall 50 in operation.

It should be evident that the response to input pressure of the restrictor 10 is a complex function of many factors. Included in these factors are the hardness of the elastomer used in manufacture, the diameter of the orifice 20, the length of the orifice 20, i.e., the thickness of wall 50, the length, inner, and outer diameter dimensions of the upstream flange 26 and of the downstream flange 24, and the exact size of the diameter and length of the main section 24. All of these must be balanced to provide a uniform volume response over desired pressure ranges using the geometry disclosed herein.

FIG. 4 graphically illustrates a typical application of the restrictor of the instant type in operation with a Browning B-400-.4B sprinkler to produce a uniform time rate of water delivery over a broad pressure range. The upper line labeled A is the pressure response of the sprinkler by itself. The response line B was produced by a restrictor with the following characteristics:

| | |
|---|---|
| Hardness of Elastomer | ~60 A |
| Outside Diameter of Main Body (24) | .75 in. |
| Height of Upstream Flange (26) | .30 in. |
| Outer Diameter of Upstream Flange (26) | .586 in. |
| Inner Diameter of Upstream Flange (26) | .359 in. |
| Height of Downstream Flange (28) | .30 in. |
| Outer Diameter of Downstream Flange (24) | .586 in. |
| Inner Diameter of Downstream Flange (24) | .359 in. |
| Axial Length of Main Body (24) | .20 in. |
| Diameter of Orifice | .092 in. |

As the graph reveals, the restrictor produced a relatively constant flow over a wide range of pressures.

As should be evident, the foregoing specific example is not meant to limit the invention, but simply is to provide those in the art with one example as to how the geometric factors of the instant invention can be balanced along with the hardness of the elastomer to produce the desired steady volume response to varying pressure inputs within a particular range. Those skilled in the art will recognize that other dimensional and hardness combinations can be found to produce satisfactory curves over different pressure ranges. It must be recognized that not all arbitrary combinations of hardness and dimensions will produce satisfactory results, the hardness of the elastomer must be balanced with the dimensions to produce the response desired within any desired pressure range. However, properly selected hardness and dimensioned restrictors shaped as disclosed herein exhibit an improved pressure response range and cut-off only at very high pressures, as desired.

Finally, those skilled in the art will recognize that the flow response to pressure input as illustrated in the graph of FIG. 4 will also depend upon the orifice size of the final system output. This is due to the effects of back pressure, and is illustrated in FIG. 5 graphically.

FIG. 5 is a graph of the response to a fixed standard output orifice of 10/64 inches. The line labeled D was the response of the output orifice with no restrictions in the flow path. The line C was made with a restrictor with a main orifice of a diameter of 0.205 inches in the line upstream of the output orifice; the line B with a restrictor orifice diameter of 0.162 inches, and the line A with a restrictor diameter of 0.120 inches.

While a horizontal response line as achieved at most pressures for line A and at higher pressure for line B is generally most desirable, the best curve for any particular installation usually can be achieved by varying the design characteristics noted above. In almost all instances it is undesirable to design the restrictor so as to cause the flow rate curve to decrease with increased pressure, i.e., to provide less flow at higher pressure than at lower pressure.

To further assist those in the art in constructing flow restrictors according to the instant invention, the following chart is provided. Except for the change in the diameter of the orifice 20, all of the dimensions are the same as those listed previously in connection with the discussion of FIG. 4. The following diameters produced the respective flow to atmosphere in gallons per minute in the mid-range of their constant response region.

| Mid-range Flow In Gallons/Minute | Orifice Diameter |
|---|---|
| .4 GPM | .092 in. |
| .53 GPM | .0965 in. |
| .74 GPM | .120 in. |
| 1.6 GPM | .162 in. |
| 2.54 GPM | .190 in. |
| 3.0 GPM | .205 in. |
| 3.43 GPM | .220 in. |
| 5.25 GPM | .250 in. |

The foregoing specific dimensioned examples are only illustrative and are not intended to limit the invention in any way, but merely to help guide those in the art to construct embodiments of the invention.

What is claimed is:

1. An elastomeric flow restrictor for producing a relatively constant fluid volume flow over a range of input pressure comprising:
    an annular main body member having defined through it an annular flow passage orifice;
    said main body having annular flanges on the upstream and downstream sides of said orifice for strengthening the region in said main body around said orifice;
    the inner diameter of said annular flanges exceeding the diameter of said orifice;
    the exterior diameter of said flanges being less than that of the main body for defining shoulders on the main body;
    the shoulder on the downstream side being beveled slightly so that the outer perimeter is further downstream than the inner perimeter along said downstream flange; and said main body and flanges being integrally molded as a single unit from an elastomeric compound, which deforms in response to increased fluid pressure to decrease the size of the passage orifice in response to an increase in fluid pressure by flow of material from said flanges and body member to the means defining the orifice.

2. The restrictor according to claim 1 in which:

said elastomeric compound has a hardness of from 40 A to 90 A.

3. The restrictor according to claim 1 in combination with a fitting which includes:

an annular main body section which snugly fits the outer diameter of the restrictor's main body section;

upstream and downstream sections of smaller inner diameter than said annular section, which snugly fit the upstream and downstream annular flanges, respectively; and shoulders communicating the upstream and downstream sections with the annular main body section, said shoulders spaced slightly farther apart than the length of the main body section of the restrictor, whereby the restrictor is loosely fit along the flow axis directions.

4. The combination according to claim 3 in which:

said upstream and downstream sections include means for attachment to fluid input and output pipes of a fluid transport system.

* * * * *